United States Patent
Krapf et al.

(10) Patent No.: US 8,783,123 B2
(45) Date of Patent: Jul. 22, 2014

(54) LOCATING DEVICE

(75) Inventors: Reiner Krapf, Filderstadt (DE); Bjoern Haase, Stuttgart (DE); Kai Renz, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 189 days.

(21) Appl. No.: 13/126,044

(22) PCT Filed: Oct. 23, 2009

(86) PCT No.: PCT/EP2009/063944
§ 371 (c)(1),
(2), (4) Date: Jun. 22, 2011

(87) PCT Pub. No.: WO2010/049351
PCT Pub. Date: May 6, 2010

(65) Prior Publication Data
US 2011/0239794 A1    Oct. 6, 2011

(30) Foreign Application Priority Data
Oct. 27, 2008    (DE) .......................... 10 2008 043 190

(51) Int. Cl.
*G01N 19/00*    (2006.01)

(52) U.S. Cl.
USPC ........................................................ 73/865.8

(58) Field of Classification Search
None
See application file for complete search history.

(56) References Cited

U.S. PATENT DOCUMENTS

| 4,837,489 A | * | 6/1989 | McFee .............................. 324/67 |
| 5,659,247 A | * | 8/1997 | Clements ....................... 324/239 |
| 6,373,244 B1 | * | 4/2002 | Nipp ............................... 324/235 |
| 6,989,662 B2 | * | 1/2006 | Heger et al. ...................... 324/67 |

FOREIGN PATENT DOCUMENTS

| DE | 102006025861 | 12/2007 |
| EP | 1341005 | 9/2003 |

OTHER PUBLICATIONS

International Search Report corresponding to PCT Application No. PCT/EP2009/063944, mailed Mar. 22, 2010 (German and English language document) (4 pages).

* cited by examiner

*Primary Examiner* — Robert R Raevis
(74) *Attorney, Agent, or Firm* — Maginot, Moore & Beck (57) ABSTRACT

A locating device, in particular a handheld locating device, includes a locating unit configured to detect the presence of an item arranged in an examination object using an examination signal. The locating device further includes a motion sensor unit configured to detect at least one motion parameter along at least one direction of motion. In addition, the locating device includes an evaluation unit configured to evaluate the motion parameter and at least one locating parameter of the locating unit together.

14 Claims, 5 Drawing Sheets

LOCATING DEVICE

This application is a 35 U.S.C. §371 National Stage Application of PCT/EP2009/063944, filed Oct. 23, 2009, which claims the benefit of priority to Serial No. 10 2008 043 190.7, filed Oct. 27, 2008 in Germany, the disclosures of which are incorporated herein by reference in their entirety.

BACKGROUND

The disclosure relates to a locating device having the features set forth herein.

A locating device, in particular a handheld locating device, having a locating unit, which is intended to detect the presence of an item arranged in an examination object using an examination signal, is already known. In addition, the locating device has a motion sensor unit which is intended to detect at least one motion parameter along at least one direction of motion.

SUMMARY

The disclosure is based on a locating device, in particular a handheld locating device, having a locating unit, which is intended to detect the presence of an item arranged in an examination object using an examination signal, and a motion sensor unit which is intended to detect at least one motion parameter along at least one direction of motion.

The disclosure proposes that the locating device has an evaluation unit which is intended to evaluate the motion parameter and at least one locating parameter of the locating unit together. In this context, "intended" should be understood as meaning, in particular, specially equipped and/or specially designed and/or specially programmed. In this case, the locating unit may have an inductive sensor and/or a capacitive sensor and/or a 50/60-Hz sensor and/or a radar sensor and/or an IR sensor and/or other sensors which appear to be sensible to a person skilled in the art for detecting items arranged in the examination object. The locating parameter of the locating unit may be formed by a voltage parameter and/or a dielectric parameter and/or a current parameter and/or other parameters which appear to be sensible to a person skilled in the art. The motion sensor unit may comprise all motion sensors which appear to be sensible to a person skilled in the art and detect motion and/or acceleration of the locating device. The motion sensor unit advantageously has an acceleration sensor and/or an optical sensor and/or a mechanical sensor. The acceleration sensor may be formed, for example, by a MEMS sensor (Micro-Electro-Mechanical System) which outputs acceleration of the locating device in voltage values and makes it detectable for data processing. The optical sensor may have a method of operation which is substantially similar to an optical computer mouse, for example. The mechanical sensor may be formed by a sensor substantially similar to a ball computer mouse and/or by a vibration and/or inclination sensor. In this case, the motion parameter may be formed by a parameter of a voltage and/or an optical parameter and/or a parameter of an inclination angle and/or other motion parameters which appear to be sensible to a person skilled in the art. In this context, an "evaluation unit" should be understood as meaning, in particular, a unit which may be formed by a computation unit and/or a control unit, the evaluation unit being able to be formed both by a processor alone and, in particular, by a processor and further electronic components, for example a storage means. The evaluation unit may be particularly advantageously formed by a microcontroller or a digital data evaluation means, an analog/digital converter advantageously being arranged upstream of the evaluation unit.

The refinement according to the disclosure makes it possible to advantageously process data from the locating unit in a spatially resolved manner and to advantageously achieve a powerful locating device with a high degree of user-friendliness and a high degree of ease of operation for an operator of the locating device. Particularly fast and matched data evaluation of the different parameters can also be carried out and, in association therewith, fast detection of an internal structure of the examination object, for example a wall. In particular, it is possible to advantageously distinguish between unwanted interference signals, which may be caused, for example, by tilting of the locating device and/or by wall inhomogeneities, and a measurement signal resulting from an item inside the examination object in the evaluation unit.

The disclosure also proposes that the evaluation unit is intended to at least partially automatically calibrate the locating unit using a locating parameter of the locating unit and the motion parameter. In this case, it is advantageously possible to dispense with calibration, in particular time-consuming calibration, of the locating unit or locating device by the operator. In addition, miscalibration, for example when placing a conventional locating device on a surface of a wall, in particular with an inhomogeneous structure, can be advantageously prevented and associated faulty measurements can at least be reduced. The evaluation unit is particularly advantageously intended to automatically calibrate the locating unit at the start of a measuring process.

One advantageous development proposes that the evaluation unit is intended to set a dynamic threshold value for a measurement on the basis of a locating parameter of the locating unit and/or the motion parameter. In this context, a "threshold value" should be understood as meaning, in particular, a value for a lower limit of the locating parameter, which value makes it possible to advantageously detect the item and simultaneously to advantageously suppress noise signals and/or background signals, with the result that a locating process or a measurement result can be output in a manner which is advantageous for an operator. Furthermore, a "dynamic threshold value" should be understood as meaning, in particular, a threshold value which is, in particular, always adapted by the evaluation unit, in particular, to current sensor signals and/or locating parameters and/or the motion parameter. The threshold value is preferably set automatically by the evaluation unit during a measuring process. This refinement of the disclosure makes it possible to precisely detect or measure items inside the examination object and to at least reduce undesirable misinterpretation of the locating parameters.

The disclosure also proposes that the evaluation unit has at least one storage means which is intended to store a locating parameter of the locating unit and/or the motion parameter. In this case, during a measuring process using the locating device, in particular if the locating device is moved over the same wall surface repeatedly, an item of location information relating to items in the wall and/or wall inhomogeneities can be advantageously stored and a measuring process and/or a display of a display unit of the locating device can therefore be matched to the item.

The disclosure also proposes that the locating device has a display unit having a display area, the evaluation unit being intended to at least partially automatically adapt the display area to the locating parameter. In this context, a "display unit" should be understood as meaning, in particular, a unit which is intended to optically output measurement results to an operator during operation of the locating unit. The display unit preferably comprises a display means and/or an output means, for example a display and/or other output means which appear to be sensible to a person skilled in the art. Furthermore, a "display area" should be understood as meaning, in particular, an area of the display unit which can be varied on the basis of a magnitude, in particular an amplitude, of a measurement signal, in which case it is possible to use greater scaling for displaying measurement signals of small amplitude than for displaying measurement signals of large amplitude. In this case, the different measurement signals can be represented in a detailed manner and it is advantageously possible to avoid manually changing over the display area. In addition, a locating process can be output in a manner which is advantageous for an operator.

The motion sensor unit is particularly advantageously intended to detect motion along at least two directions of motion and particularly preferably along three directions of motion. The at least two or the three directions of motion are preferably each oriented such that they are orthogonal to one another. In this case, motion of the locating device in a three-dimensional space can be advantageously detected and individual motion sequences of the locating device, for example the locating device being placed on a wall, the locating device approaching the wall, the locating device moving on the wall surface, the locating device changing direction when moving, etc., can be advantageously detected in the process and distinguished from one another and can be advantageously taken into account when evaluating the locating parameters.

The disclosure also proposes that the locating unit has at least two sensor elements, thus making it possible to detect items in a redundant and, in particular, effective manner. In particular, it is possible to distinguish in this case between items and interference signals, for example tilting of the locating device and/or inhomogeneities of a wall etc., in a particularly simple manner. The at least two sensor elements are particularly advantageously each formed by a capacitive sensor.

The evaluation unit is preferably intended to minimize interference in the locating parameter during data evaluation using the motion parameter, thus making it possible to locate items in an efficient manner and at least partially without errors. In this case, the evaluation unit particularly advantageously has at least one interference reduction algorithm. The interference reduction algorithm and/or use of the interference reduction algorithm can advantageously be controlled in this case by the evaluation unit using the detected motion parameter, for example during median formation which is dependent on movement of the locating device and is preferably supposed to be carried out only during movement of the locating device and is supposed to stop when the locating device is at a standstill. Furthermore, it is also conceivable for median formation to also be able to be carried out on the basis of a speed of the locating device during movement, in which case strong averaging of measured data and/or parameters can be carried out when the locating device is moved at a high motion speed and weak averaging of the measured data and/or parameters can be carried out when the locating device is moved at a low motion speed.

Another refinement of the disclosure proposes a method, in particular using a locating device, a motion parameter along at least one direction of motion and a locating parameter being detected and being evaluated together. Data from the locating unit can be advantageously processed in a spatially resolved manner and a powerful locating device with a high degree of user-friendliness and a high degree of ease of operation for an operator of the locating device can be advantageously achieved. Particularly fast and matched data evaluation of the different parameters can also be carried out and, in association therewith, fast detection of an internal structure of the examination object, for example a wall. In particular, it is possible to advantageously distinguish between unwanted interference signals, which may be caused, for example, by tilting of the locating device and/or by wall inhomogeneities, and a measurement signal resulting from an item inside the examination object in the evaluation unit. In addition, the motion parameter may also be directly included in data evaluation by being able to improve, for example, a signal-to-noise ratio, in particular by forming the median and/or averaging measurement data over a path and/or location. Median formation is preferably tied to motion and/or movement of the locating device, with the result that median formation also stops when motion and/or movement of the locating device stops in the continued measuring process in order to thus advantageously avoid incorrect weighting of data, for example in a location index.

The disclosure also proposes that a locating unit is at least partially automatically calibrated. In this case, it is advantageously possible to dispense with calibration, in particular time-consuming calibration, of the locating unit or locating device by the operator. In addition, miscalibration, for example when placing a conventional locating device on a surface of a wall, in particular with an inhomogeneous structure, can be advantageously prevented and associated faulty measurements can at least be reduced. Furthermore, miscalibration can be advantageously avoided, in particular in the case of a metal locating device, by the metal locating device being held in the air by an operator in a simple manner and the absence of any metal thus being ensured during a calibration process of the locating unit. The evaluation unit is particularly advantageously intended to automatically calibrate the locating unit at the start of a measuring process.

The disclosure also proposes that a dynamic threshold value for a measurement is set on the basis of the locating parameter and/or the motion parameter. The dynamic threshold value is preferably set automatically by the evaluation unit during a measuring process. This refinement of the disclosure makes it possible to simplify detection and measurement of items inside the examination object and makes it possible to at least reduce undesirable misinterpretation of the locating parameters.

In addition, the disclosure proposes that a display area of a display unit is at least partially automatically adapted to a measuring amplitude. In this case, the different measurement signals can be represented in a detailed manner and it is advantageously possible to avoid manually changing over the display area. In addition, a locating process can be output in a manner which is advantageous for an operator.

BRIEF DESCRIPTION OF THE DRAWING

Further advantages emerge from the following description of the drawing. The drawing illustrates an exemplary embodiment of the disclosure. The drawing, the description and the claims contain numerous features in combination. A person of ordinary skill in the art will expediently also consider the features individually and will combine them to form sensible further combinations.

In the drawing.

DETAILED DESCRIPTION

Figure 1:
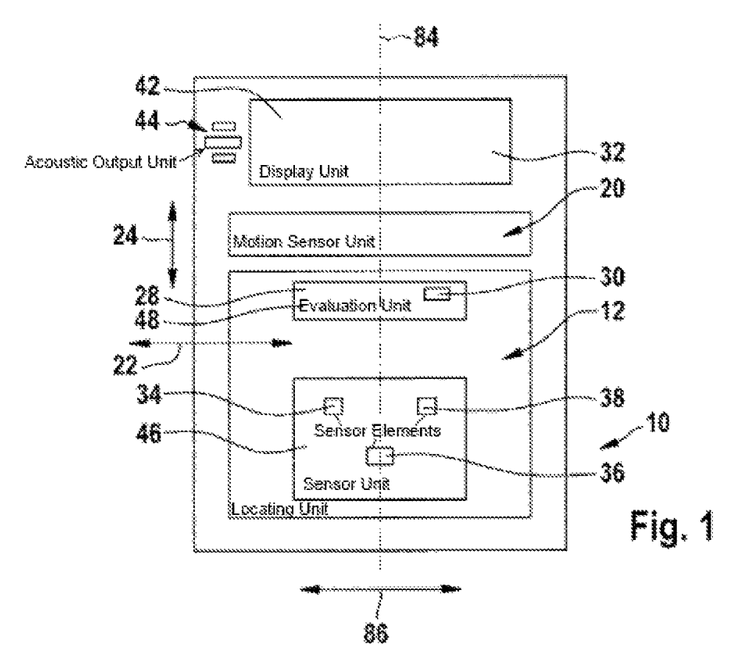
FIG. 1 shows a schematic view of a locating device having a locating unit.
Figure 2:
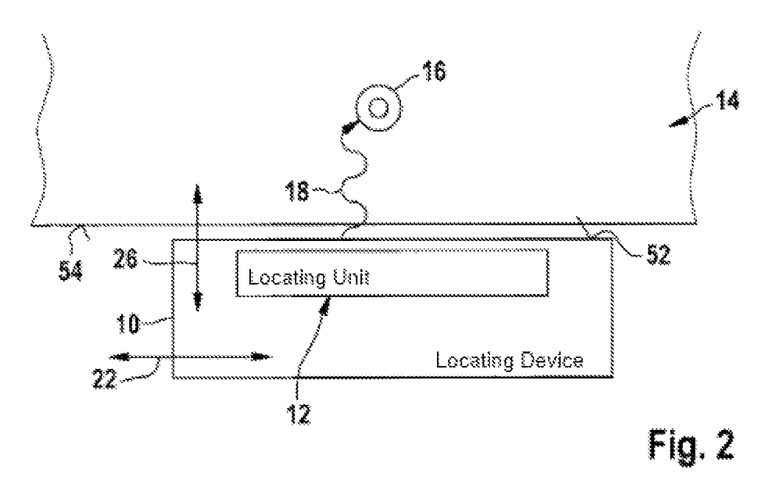
FIG. 2 shows a schematic view of the locating device together with an examination object.

FIGS. 1 and 2 schematically illustrate a handheld locating device 10. The locating device 10 has a locating unit 12 which is intended to detect the presence of an item 16 arranged in an examination object 14, for example a wall, using an examination signal 18. The locating device 10 also has an evaluation unit 28 which is intended to evaluate a measured signal. Furthermore, the locating device 10 has a motion sensor unit 20, which is intended to detect a motion parameter $BK_i$ along at least one direction of motion 22, 24, 26 during operation of the locating device 10, and a display unit 32 which is intended to optically output a measurement result to an operator of the locating device 10 during a measuring process or measurement operation of the locating device 10. For this purpose, the display unit 32 has a display means 42 formed by a display. Alternatively, the display unit 32 may comprise further display means, for example a light-emitting diode and/or other display means 42 which appear to be sensible to a person skilled in the art. The locating device 10 also has an acoustic output unit 44 which is intended to acoustically output information to the operator.

Figure 3:
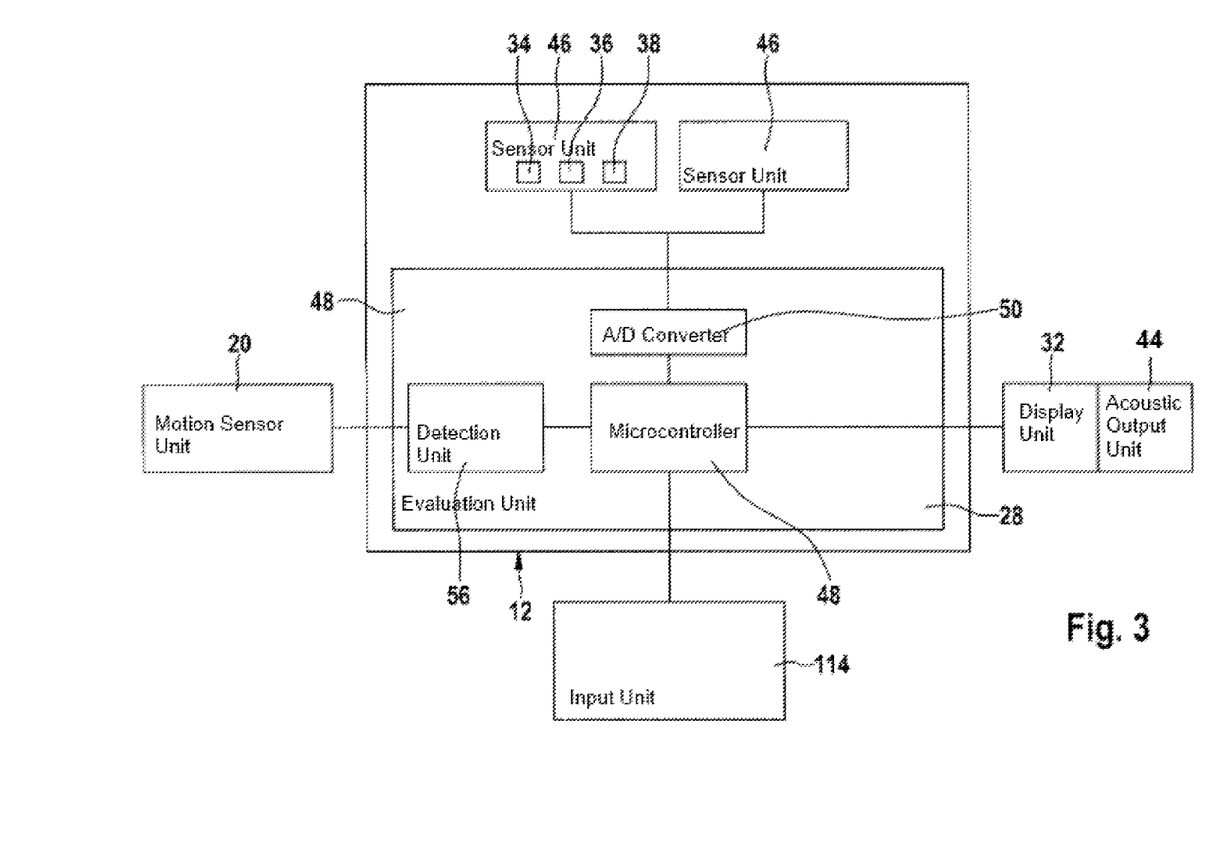
FIG. 3 shows a schematic circuit diagram of the locating device.

FIG. 3 illustrates a schematic circuit diagram of the locating device 10 in more detail. The locating unit 12 has at least one sensor unit 46 or a plurality of sensor units 46 which may be formed by an inductive sensor unit and/or a capacitive sensor unit and/or a 50/60-Hz sensor unit and/or a radar sensor unit and/or an infrared sensor unit and/or other sensor units 46 which appear to be sensible to a person skilled in the art. However, a subsequent description of the disclosure is substantially restricted to a design of the sensor unit 46 in a form of a capacitive sensor unit, in which case a method of operation for evaluating locating parameters $OK_i$ of the sensor unit 46 and motion parameters $BK_i$ of the motion sensor unit 20 substantially remains the same with a different design of the sensor unit 46.

During operation of the locating unit 12, the sensor unit 46 or the capacitive sensor unit detects locating parameters $OK_i$ which are passed to the evaluation unit 28 via a data line (not illustrated in any more detail). During operation of the locating device 10, the capacitive sensor unit detects locating parameters $OK_i$ which are formed from dielectric parameters, an item of information relating to, or a dielectric property of, the examination object 14 or of the item 16 arranged in the latter being detected using the dielectric parameters. The evaluation unit 28 has a microcontroller 48 which is intended to evaluate the locating parameter $OK_i$. The evaluation unit 28 has an analog/digital converter 50 for converting the locating parameters $OK_i$, which are formed, in particular, from analog data and/or parameters, into digital data. The evaluation unit 28 is also connected to the motion sensor unit 20 via the data line (not illustrated in any more detail) in order to transmit the motion parameters $BK_i$. In this exemplary embodiment, the motion sensor unit 20 detects motion parameters $BK_i$ along three directions of motion 22, 24, 26, the individual directions of motion 22, 24, 26 being oriented such that they are substantially orthogonal to one another. In principle, however, it is conceivable for the motion sensor unit 20 to detect only one motion parameter $BK_1$ along only one direction of motion 22, 24, 26 or two directions of motion 22, 24, 26 in an alternative refinement of the disclosure. Two of the three directions of motion 22, 24, 26 span an area which is parallel to a housing surface 52 of the locating device 10, which housing surface is arranged parallel to a wall surface 54 of the examination object 14 when the locating device 10 is operated as intended (FIG. 2).

The motion sensor unit 20 may comprise an acceleration sensor, for example a MEMS sensor, which outputs acceleration in a motion parameter $BK_i$ formed by a voltage parameter. A speed can be determined by integrating the motion parameter $BK_i$ over a time t and a distance covered can be determined by integrating the motion parameter $BK_i$ twice. Furthermore, the motion sensor unit 20 may comprise an optical sensor for detecting the motion parameter $BK_i$. The optical motion sensor may be constructed in this case in a similar manner to an optical computer mouse, which sensor has image recording elements and evaluates reflected differences in brightness by illuminating a measurement surface, for example using an LED and/or a laser etc., and determines a direction and/or speed. The motion sensor unit 20 may also comprise a mechanical sensor which may be constructed in a similar manner to a ball computer mouse. Alternatively, the mechanical sensor may also be formed by a vibration/inclination sensor with a conductive ball, the vibration/inclination sensor being able to detect a position of the ball in a metal housing of the sensor unit by closing a contact. The motion sensor unit 20 may also comprise an inclination sensor with an electrolyte, in which an angle of inclination is detected by closing a contact. Alternatively, it is possible to form the motion sensor unit 20 with all sensors which appear to be sensible to a person skilled in the art. Furthermore, the motion sensor unit 20 may be provided with signal preprocessing which may comprise, in particular, drift or temperature correction.

Figure 5:
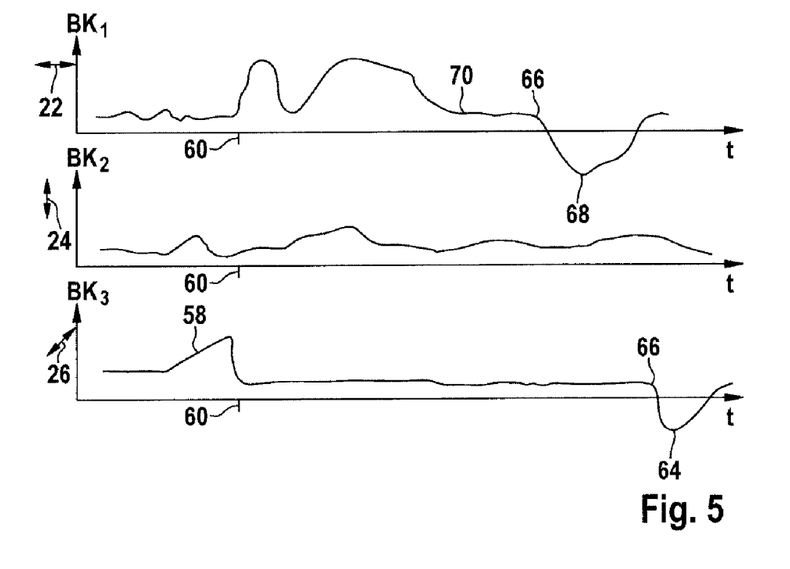
FIG. 5 shows an illustration of a signal profile of motion parameters along three directions of motion on the basis of time t.

The data or motion parameters $BK_i$ of the motion sensor unit 20 are passed to a detection unit 56 of the evaluation unit 28 during operation of the locating device 10, a first signal processing operation being carried out in the detection unit 56. The parameters of the sensor unit 46 and of the motion sensor unit 20 are evaluated together in the evaluation unit 28. Measurement results are output via the display unit 32 and/or the acoustic output unit 44 (FIG. 3). Furthermore, the locating device 10 has an input unit 114 via which the operator of the locating device 10 can input a selection of a measuring module and/or other control data which appear to be sensible to a person skilled in the art. In this case, the input unit 114 may be at least partially formed by a keyboard. FIG. 5 illustrates the motion parameters $BK_i$ sensed by the motion sensor unit 20 over a time t. The three motion parameters $BK_1$, $BK_2$, $BK_3$ each indicate motion along a direction of motion 22, 24, 26, the individual directions of motion 22, 24, 26 being oriented such that they are orthogonal to one another (FIGS. 1 and 2). In this case, the first and second directions of motion 22, 24 substantially span the area which is oriented substantially parallel to the housing surface 52, the housing surface 52 being formed by a surface of the locating device 10, which surface faces the examination object 14 and is substantially parallel to the surface of the examination object 14, during correct measurement operation. The third direction of motion 26 is oriented such that it is substantially perpendicular to the first and second directions of motion 22, 24. After the locating device 10 has been switched on, it is moved toward the examination object substantially along the third direction of motion 26, which becomes noticeable by a steep rise 58 in the motion parameter $BK_3$ along the third direction of motion 26. After the locating device 10 has been placed 60 on the wall surface 54, the locating device 10 is moved substantially with respect to the wall surface 54, with the result that the motion parameter $BK_3$ remains virtually constant along the third direction of motion 26 and indicates a signal change only when the locating device 10 is raised 62, the motion parameter $BK_3$ of the third direction of motion 26 forming a negative signal value 64 here. Motion of the locating device 10 parallel to the wall surface 54 can be detected in the signal profile of the motion parameters $BK_1$, $BK_2$ of the first and second directions of motion 22, 24 during operation of the motion sensor unit 20. In this case, the locating device 10 can be moved directly on the wall surface 54 by an operator or can be moved at a distance parallel to the wall surface 54, the locating device 10 having, for this purpose, sliding elements (not illustrated in any more detail) which may be formed by felt sliders which enable an exact distance between the locating device 10 and the wall surface 54 during movement of the locating device 10. A different signal profile is shown in the two motion parameters $BK_1$, $BK_2$ depending on a movement of the locating device 10. In addition, a reversal of direction 66 can be detected by a negative signal value 68 in one of the two motion parameters $BK_1$, $BK_2$ along one of the two directions of motion 22, 24. The stopping of motion 70 of the locating device 10 can be discerned by a signal drop to a basic level in the motion parameters $BK_1$, $BK_2$, $BK_3$.

Figure 6:
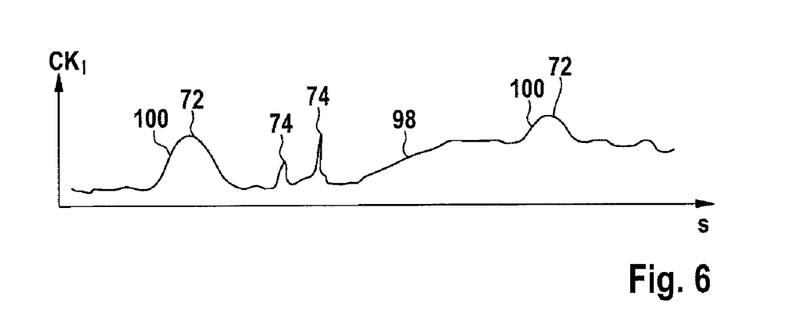
FIG. 6 shows an illustration of a signal profile of a locating parameter on the basis of a direction of motion.

FIG. 6 illustrates a signal profile of a locating parameter $OK_i$ of a sensor element 34, 36, 38 of the locating unit 12 over a distance s. An item 16 is detected by a signal swing 72 in the locating parameters $OK_i$. The sensor elements 34, 36, 38 already detect an item 16 arranged in the examination object 14 at a distance of approximately 4 cm along the direction of motion 22. This becomes noticeable first of all by a slow signal rise at the start of the signal swing 72 and a parabolic profile of the signal swing 72. Further signal swings which are formed by interference signals 74 can also be discerned in the signal profile of the locating parameter $OK_i$.

Figure 4:
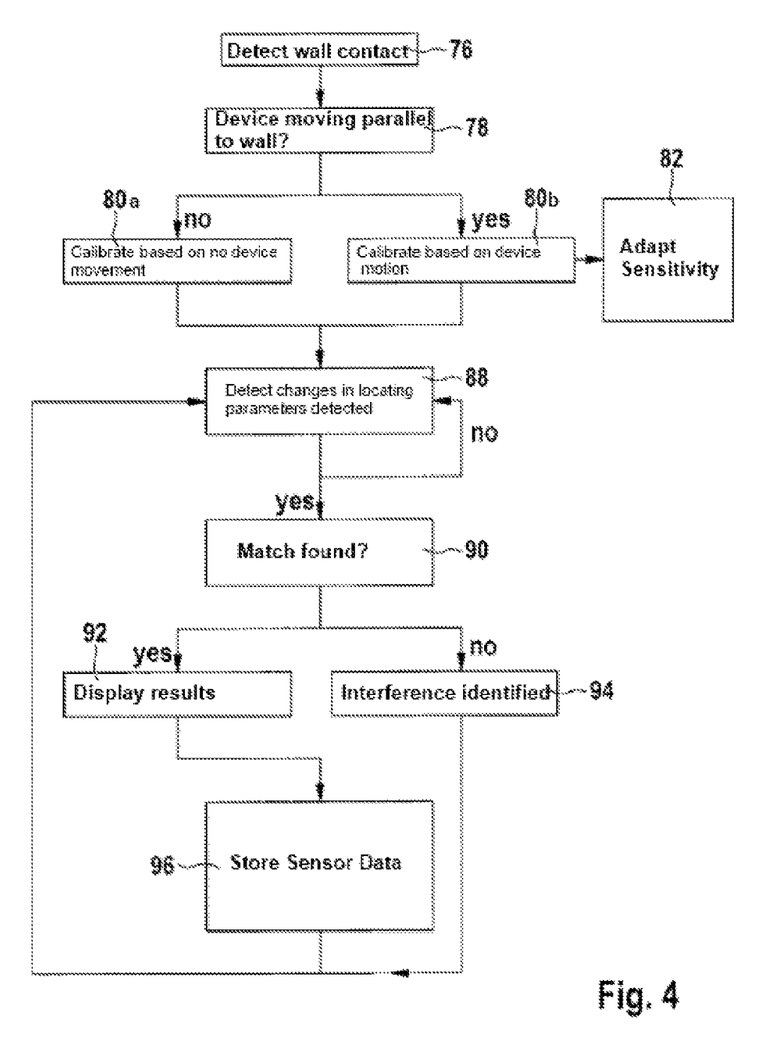
FIG. 4 shows a method sequence of a locating measurement.

FIG. 4 illustrates a schematic sequence of a measuring process of the locating device 10 in more detail. After the locating device 10 has been switched on and/or activated, the evaluation unit 28 detects possible wall contact (block 761 between the locating device 10 and the wall to be examined (FIG. 4). Wall contact is substantially determined by detecting motion perpendicular to the wall surface 54 along the third direction of motion 26. Motion of the locating device 10 on or parallel to the wall surface 54 is then detected in the form of two motion parameters $BK_1$, $BK_2$ using the motion sensor unit 20 (block 78), and the locating unit 12 is automatically calibrated by the evaluation unit 28 (blocks 80a, 80b). For the purpose of calibration, the evaluation unit 28 evaluates the motion parameters $BK_i$ together with the locating parameters $OK_i$ which are detected by the sensor unit 46. The sensor unit 46 has a plurality of sensor elements 34, 36, 38 which each detect a locating parameter $OK_i$. The locating unit 12 can be calibrated (blocks 80a, 80b) both when the locating device 10 is being moved over the wall surface 54 or along a direction parallel to the wall surface 54 (block 80b) and when the locating device 10 is not being moved (block 80a). When the sensor unit 46 has more than two sensor elements 34, 36, 38 which are formed by capacitive sensor elements, the evaluation unit 28 may select those sensor elements 34, 36, 38 for calibration which have maximum sensitivity along a direction of motion of the locating device 10. For the purpose of calibration, the locating device 10 may also be held in the air by the operator, with the result that the sensor elements 34, 36, 38 of the sensor unit 46 remain uninfluenced by possible interference, in particular by metal items which may be arranged in the measurement object.

If calibration (block 80b) is carried out when the locating device 10 is being moved along the direction parallel to the wall surface 54 (block 78), the evaluation unit 28 can possibly automatically adapt (block 82) the sensitivity or set a dynamic threshold value of the individual sensor elements 34, 36, 38. In this case, the sensitivity of the dynamic threshold value is dependent on a signal change of the sensed signals or locating parameters $OK_i$ over the distance covered by the locating device 10 or on a property of the examination object 14 along the distance covered by the locating device 10. For example, inhomogeneities in a surface layer of the examination object 14 may produce large background signals in this case which can be at least partially suppressed by adapting (block 82) the sensitivity. The evaluation unit 28 continuously adapts (block 82) the sensitivity or the dynamic threshold values of the individual sensor elements 34, 36, 38 to current locating parameters $OK_i$. The evaluation unit 28 selects the sensitivity or the dynamic threshold values in such a manner that interference signals are not displayed in the display unit 32. In addition to inhomogeneities, interference signals may also be caused in this case by surface effects of the examination object 14 which may have a greater effect on the sensor signal than an item 16. The evaluation unit 28 can reduce the sensitivity of the individual sensor elements 34, 36, 38 and can increase the dynamic threshold values to such an extent that these interference effects are below a sensitivity range.

Figure 7:
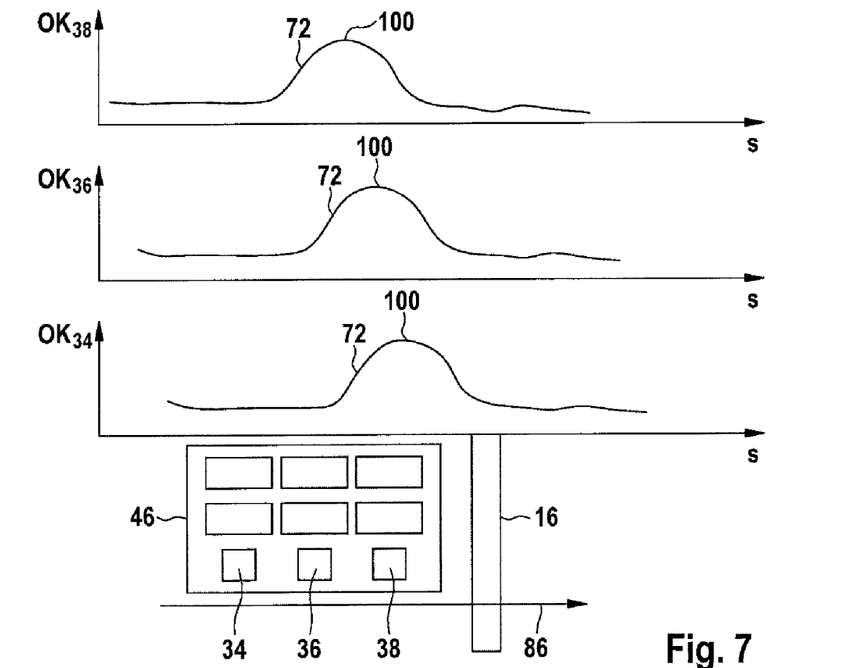
FIG. 7 shows an illustration of a signal profile of locating parameters of three sensor elements on the basis of a direction of motion.

The locating parameters $OK_i$ of the individual sensor elements 34, 36, 38 of the sensor unit 46 are then evaluated on the basis of location. The sensor elements 34, 36, 38 are arranged such that they are spatially distributed inside the sensor unit 46 (FIG. 7). When the locating device 10 is moved along a preferred direction or in the case of a preferred direction of movement 86 of the locating device 10 parallel to the wall surface 54, the individual sensor elements 34, 36, successively cover the same subregions of the examination object 14 or item 16. In this case, the preferred direction of movement 86 of the locating device 10 is oriented substantially perpendicular to a longitudinal axis 84 of the locating device 10. For the purpose of data evaluation, the evaluation unit 28 determines the direction of movement 86 of the locating device 10 from the motion parameters $BK_i$ of the motion sensor unit 20 and the individual sensor elements 34, 36, 38 of the sensor unit 46 are then analyzed with respect to a change (block 88) in the locating parameter $OK_i$. The evaluation unit 28 first of all looks for a change in the locating parameter $OK_{38}$, which may indicate an inhomogeneity and/or a sought item 16 inside the examination object 14, in the data from the sensor element 38 which first of all moves over or covers subregions of the examination object 14 or item 16 along the direction of movement 86. As soon as there is a change in the locating parameter $OK_{38}$, the remaining sensor elements 36, 34 are evaluated with respect to a change (block 90) in the locating parameter $OK_{36}$, $OK_{34}$, which substantially corresponds to the change in the locating parameter $OK_{38}$ of the first sensor element 38, even when the locating device 10 is moved on. If a substantially identical signal profile which must be successively sensed in the individual sensor elements 34, 36, 38 along the direction of movement 86 is indicated in the remaining sensor elements 34, 36, these are identified by the evaluation unit 28 as an item 16 arranged in the examination object 14. This is shown in FIG. 7, an illustration of the locating parameters $OK_i$ of the individual sensor elements 34, 36, over the distance s. Signal output of the measurement results for the operator is effected in the display unit 32 (block 92). If no match is found in the locating parameters $OK_{38}$, $OK_{36}$, $OK_{34}$, this is identified by the evaluation unit 28 as interference and the results are not output (block 94). The evaluation unit 28 also stores (block 96) the data from the sensor unit 46 and from the motion sensor unit 20 in a storage means 30 of the evaluation unit 28, with the result that these measured values are available for data analysis if the locating device 10 changes direction or if the locating device 10 moves over the subregion of the examination object 14 again. When the locating device 10 is moved on, the measuring process is repeated according to the embodiments described above.

In addition, the evaluation unit 28 can filter out interference signals or background signals in the individual sensed sensor signals from the sensor elements 34, 36, 38 using the motion parameters $BK_i$ of the motion sensor unit 20. In order to clearly identify an item 16, for example a beam, a line, a tube etc., signal changes in the locating parameters $OK_i$ must be able to be detected in all sensor elements 34, 36, 38 and must also be sensed at substantially the same position inside the examination object 14. If the signal changes differ in the individual sensor elements 34, 36, 38, undesirable interference can be inferred in the evaluation unit 28, for example tilting of the locating device 10 and/or undesirable raising of the locating device 10 (FIG. 6). Furthermore, the evaluation unit 28 can be used to look for patterns in order to identify items 16 by distinguishing items 16 from background signals and/or interference signals according to a specific pattern in the locating parameters $OK_i$, for example a parabolic profile of the locating parameter $OK_i$. In this case, the evaluation unit 28 does not take into account a fixed threshold value for the display of an item since items 16 are selected only according to the signal pattern.

In this case, the evaluation unit 28 can determine a distance covered by the locating device 10 and/or a change of direction and/or a speed of the locating device 10 from the motion parameters $BK_i$ and can use it/them to evaluate or interpret those of the individual sensor elements 34, 36, 38 (FIGS. 5 and 6). In this case, the evaluation unit 28 can also distinguish between a drift signal 98 and item signals 100 in the locating parameters $OK_i$ and/or can detect when a drift signal 98 and the item signal 100 are superimposed and can adapt signal processing to a respective situation. The drift signal 98 may be caused by temperature fluctuations, in particular temperature increases, in the sensor unit 46, in which case a signal change or a change in the locating parameters $OK_i$ can take place even when the locating device 10 is at a standstill. In addition, it is also possible to analyze a signal maximum in the locating parameters $OK_i$ with respect to the direction of motion 22, 24, 26, with the result that an exact location of an item 16 is detected by the evaluation unit 28. It is not clear from the locating parameters $OK_i$ alone whether a signal drop in the locating parameter $OK_i$ of a sensor element 34, 36, 38 results from complete coverage of the item 16 with subsequent removal from the item 16 or from a reversal of direction 66 of the locating device 10. This information gap can be filled using the motion parameter $BK_i$ and the item 16 can be clearly located in the evaluation unit 28. The evaluation unit 28 can also store the motion parameters $BK_i$ and the locating parameters $OK_i$ for a detected item 16 in the storage means 30. When the item 16 is moved over again, the evaluation unit 28 can automatically set a display area of the display unit 32 to a maximum amplitude of the locating parameters $OK_i$ using the stored locating parameters $OK_i$ and/or motion parameters $BK_i$, with the result that a maximum resolution of the display unit 32 is used to display the sensed item 16 for the operator and there is no need for the operator to manually change over the area.

During operation of the locating device 10, the evaluation unit 28 can dynamically adapt a number or frequency of measured value averaging processes to the motion speed of the locating device 10. If the locating device 10 is moved at a high speed across the examination object 14 in this case, measured value averaging of the motion parameters $BK_i$ of the individual sensor elements 34, 36, 38 is rarely carried out by the evaluation unit 28, thus resulting in low sensitivity of the locating unit 12 and a rough estimation of items 16 arranged in the examination object 14. In contrast, if the locating device 10 is moved at a slow speed across the examination object 14, the evaluation unit 28 is used to frequently average measured values, with the result that a signal-to-noise ratio is improved and the sensitivity of the locating unit 12 is increased. In this case, items 16 in the examination object 14 can be precisely detected and located. The measurement results are output in the display unit 32 or in the acoustic output unit 44 by outputting a signal tone. In addition, measured value averaging is dependent on movement of the locating device 10 and is carried out only during movement of the locating device 10, with the result that measured values are not averaged when the locating device 10 is at a standstill. Measured values are averaged using interference reduction algorithms of the evaluation unit 28, use of the interference reduction algorithms being controlled on the basis of the motion parameters $BK_i$, for example on the basis of a speed of movement of the locating device 10 and/or a distinction between movement and standstill of the locating device 10.

Figure 8:
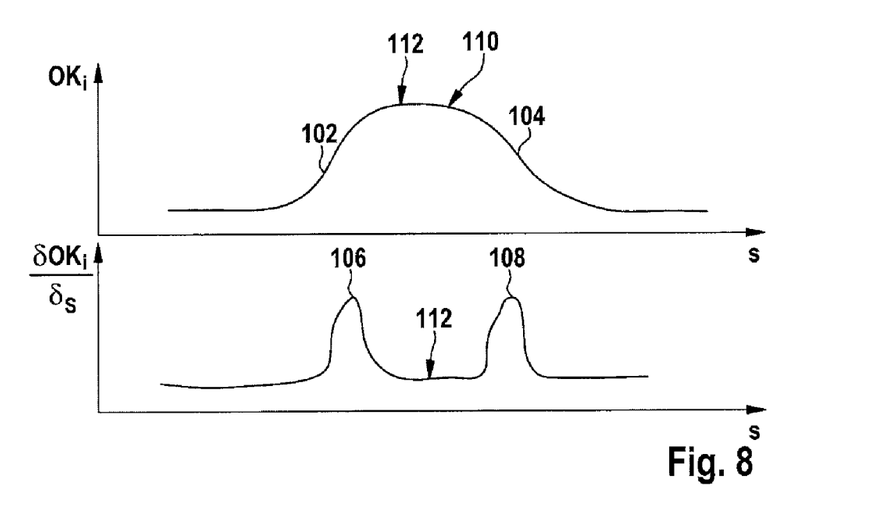
FIG. 8 shows an illustration of a differentiated item signal.

For the purpose of simplified recognition of a detected item 16 for the operator of the locating device 10, the evaluation unit 28 is also intended, during signal processing, to differentiate the locating parameter $OK_i$ or a signal profile of the locating parameter $OK_i$ according to the distance s (FIG. 8). Edges or edge regions of the item 16 become clearly apparent, in particular, in the differentiated locating parameters $OK_i$ on account of a steep signal rise 102 and signal drop 104 which indicate a start 106 and an end 108 of the item 16 along the direction of movement 86 of the locating device 10 for the operator. On account of a virtually flat signal profile 110 in the center 112 of the item 16 along the direction of movement 86 of the locating device 10, the center 112 scarcely appears in this selected form of the display.

The invention claimed is:

1. A locating device, comprising:
   a locating unit configured to detect the presence of an item arranged in an examination object and to output a signal having at least one locating parameter indicative of the detection,
   a motion sensor unit configured to detect at least one motion parameter along at least one direction of motion, the at least one motion parameter including acceleration, and
   wherein the locating unit includes an evaluation unit configured to evaluate the at least one locating parameter of the locating unit depending on the at least one motion parameter.

2. The locating device as claimed in claim 1, wherein the evaluation unit is configured to at least partially automatically calibrate the locating unit using the locating parameter and the motion parameter.

3. The locating device as claimed in claim 1, wherein the evaluation unit is configured to set a dynamic threshold value for a measurement on the basis of the locating parameter and/or the motion parameter.

4. The locating device as claimed in claim 1, wherein the evaluation unit has at least one storage device configured to store the locating parameter and/or the motion parameter.

5. The locating device as claimed in claim 1, further comprising a display unit having a display area, wherein the evaluation unit is configured to at least partially automatically adapt a scale of the display area to the locating parameter.

6. The locating device as claimed in claim 1, wherein the motion sensor unit is configured to detect motion along at least two directions of motion.

7. The locating device as claimed in claim 1, wherein the locating unit has at least two sensor elements.

8. The locating device as claimed in claim 1, wherein the evaluation unit is configured to minimize interference in the locating parameter during data evaluation using the motion parameter.

9. The locating device as claimed in claim 8, wherein the evaluation unit has at least one interference reduction algorithm.

10. A method of using a locating device having (i) a locating unit configured to detect the presence of an item arranged in an examination object using an examination signal and to output a signal having at least one locating parameter indicative of the detection, (ii) a motion sensor unit configured to detect at least one motion parameter in each of a plurality of directions of motion simultaneously, the at least one motion parameter including at least one of motion and acceleration, and (iii) the locating unit including an evaluation unit configured to evaluate the motion parameter and at least one locating parameter of the locating unit together, the method comprising evaluating at least one locating parameter of the locating unit depending on the at least one motion parameter.

11. The method as claimed in claim 10, wherein the locating unit is at least partially automatically calibrated.

12. The method as claimed in claim 10, wherein a dynamic threshold value for a measurement is set on the basis of the locating parameter and/or the motion parameter.

13. The method as claimed in claim 10, wherein the locating device further includes a display unit having a display area that is at least partially automatically adapted to adjust a display scale based on a measuring amplitude of a measurement signal.

14. A locating device, comprising:
- a locating unit configured to detect the presence of an item arranged in an examination object and to output a signal having at least one locating parameter indicative of the detection,
- a motion sensor unit configured to detect at least one motion parameter along at least one direction of motion, the at least one motion parameter including at least one of motion and acceleration, and
- wherein the locating unit includes an evaluation unit configured to evaluate the at least one locating parameter of the locating unit depending on the at least one motion parameter,
- wherein the evaluation unit is configured to minimize interference in the locating parameter during data evaluation using the motion parameter, and
- wherein the evaluation unit has at least one interference reduction algorithm.

\* \* \* \* \*